(12) United States Patent
Finlow-Bates et al.

(10) Patent No.: US 8,675,535 B2
(45) Date of Patent: Mar. 18, 2014

(54) REDUCING POWER CONSUMPTION IN A MOBILE COMMUNICATION DEVICE IN RESPONSE TO MOTION DETECTION

(75) Inventors: Keir Finlow-Bates, Kangasala (FI); Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 13/348,050

(22) Filed: Jan. 11, 2012

(65) Prior Publication Data

US 2013/0176869 A1    Jul. 11, 2013

(51) Int. Cl.
G08C 17/00     (2006.01)
H04L 1/00      (2006.01)
H04L 12/26     (2006.01)
H04H 20/71     (2008.01)

(52) U.S. Cl.
USPC ............................ 370/311; 370/252; 370/312

(58) Field of Classification Search
USPC ......................................... 370/252, 311, 312
See application file for complete search history.

(56) References Cited

U.S. PATENT DOCUMENTS

| | | | |
|---|---|---|---|
| 5,799,256 A | 8/1998 | Pombo et al. | |
| 6,584,331 B2 | 6/2003 | Ranta | |
| 7,408,506 B2 | 8/2008 | Miller | |
| 7,633,389 B2 | 12/2009 | Mantovani et al. | |
| 2002/0094820 A1* | 7/2002 | Keranen et al. | 455/456 |
| 2007/0004414 A1 | 1/2007 | Seki et al. | |
| 2007/0247366 A1* | 10/2007 | Smith et al. | 342/464 |
| 2008/0112346 A1* | 5/2008 | Tolpin et al. | 370/311 |
| 2008/0129461 A1* | 6/2008 | Abraham | 340/10.1 |
| 2008/0248808 A1 | 10/2008 | Alizadeh-Shabdiz | |
| 2009/0164813 A1 | 6/2009 | Tu et al. | |
| 2010/0026479 A1* | 2/2010 | Tran | 340/501 |
| 2011/0021207 A1 | 1/2011 | Morgan et al. | |
| 2011/0050421 A1* | 3/2011 | Duron et al. | 340/572.1 |
| 2011/0090081 A1 | 4/2011 | Khorashadi et al. | |
| 2011/0148699 A1 | 6/2011 | Anderson et al. | |
| 2011/0269478 A1 | 11/2011 | Das et al. | |
| 2011/0298659 A1 | 12/2011 | Alizadeh-Shabdiz | |
| 2013/0029607 A1* | 1/2013 | Rosener | 455/67.7 |

OTHER PUBLICATIONS

International Search Report and Written Opinion—PCT/US2013/020370—ISA/EPO—May 14, 2013.

* cited by examiner

*Primary Examiner* — Ronald Abelson

(74) *Attorney, Agent, or Firm* — Mahamedi Paradice Kreisman LLP

(57) ABSTRACT

A method and apparatus to selectively enable and disable one or more modules in a mobile communication device based on a variation in received signal strength indicator (RSSI) values to reduce power consumption while the mobile device is relatively stationary.

12 Claims, 5 Drawing Sheets

| BSSID | RSSI_Old | RSSI_New | Δ | |
|---|---|---|---|---|
| MAC1 | 15 | N/A | N/A | 451 |
| MAC2 | 18 | N/A | N/A | 452 |
| MAC3 | 17 | N/A | N/A | 453 |
| MAC4 | 20 | N/A | N/A | 454 |
| MAC5 | 21 | N/A | N/A | 455 |

| BSSID | RSSI_Old | RSSI_New | Δ | |
|---|---|---|---|---|
| MAC1 | 15 | 16 | 1 | 451 |
| MAC2 | 18 | 12 | 6 | 452 |
| MAC3 | 17 | 36 | 19 | 453 |
| MAC4 | 20 | 33 | 13 | 454 |
| MAC5 | 21 | -- | 21 | 455 |

REDUCING POWER CONSUMPTION IN A MOBILE COMMUNICATION DEVICE IN RESPONSE TO MOTION DETECTION

TECHNICAL FIELD

The present embodiments relate generally to wireless communication, and specifically to reducing power consumption in wireless communication devices.

BACKGROUND OF RELATED ART

With the emerging technologies of cellular networks, embedded systems, and the Internet, mobile communication devices such as a smartphone or a tablet have become popular because they combine the mobility of a cellular phone with the functionality of a computer or a personal digital assistant (PDA) into a single device. As such, many of these devices are equipped with a global navigation satellite system (GNSS) module that utilizes a network of orbiting satellites for position determination and/or navigation functions. However, the recent proliferation of wireless local area networks (WLANs) has made it possible for mobile devices to use Wi-Fi access points associated with one or more WLANs as an alternative method for position determination, especially in areas where there is a large concentration of Wi-Fi access points (e.g., urban cores, shopping malls, office buildings, and so on). Moreover, WLAN navigation systems can be advantageous over satellite navigation systems because of satellite signal coverage limitations. For example, while GPS or GNSS signals may not be readily available inside a shopping mall, wireless signals generated by Wi-Fi access points inside the shopping mall are typically detectable by a Wi-Fi enabled mobile communication device.

For WLAN navigation systems, the locations of the Wi-Fi access points are used as reference points from which well-known trilateration techniques can determine the location of a Wi-Fi enabled mobile device. More specifically, the mobile device can use the received signal strength indicators (RSSI) associated with a number of visible access points as indications of the distances between the mobile device and each of the detected access points, where a stronger RSSI means that the mobile device is closer to the access point and a weaker RSSI means that the mobile device is further from the access point. The mobile device can also use the round trip time (RTT) of signals transmitted to and from the access points to estimate the distances between the mobile device and the access points, where the RTT indicates the signal propagation times of a message sent from the mobile device to the access point and a corresponding acknowledgement message sent from the access point to the mobile device. Once these distances are estimated, the location of the mobile device relative to the access points can be determined using trilateration techniques.

Although RTT ranging techniques typically provide more accurate distance measurements than RSSI techniques, RTT ranging techniques typically consume more power than RSSI ranging techniques. More specifically, while the RSSI ranging technique is a passive process in which the mobile device listens for beacon signals broadcast by the access points and then correlates the beacon signal strength to a distance, the RTT ranging technique is an active process in which the mobile device transmits a data packet to the access point, listens for a reply packet transmitted back from the access point, calculates the total travel time of the data and reply packets, and then correlates the packet travel time to a distance. Similarly, maintaining a mobile device's GNSS module in an operational state for position determination and/or movement detection is an active process that consumes an undesirable amount of power (e.g., due to the continuous monitoring of GPS signals and performing calculations associated with triangulation operations).

Because the power supply in mobile devices is often limited to batteries, any unnecessary power consumption is undesirable. Moreover, unnecessary power consumption associated with active processes such as RTT ranging operations and scanning for nearby access points is exacerbated when the mobile device is not in proximity with a WLAN. Similarly, unnecessary power consumption associated with active processes such as scanning for nearby Bluetooth devices and scanning for nearby cellular base stations is exacerbated when the mobile device is not in proximity with any Bluetooth device or cellular base stations, respectively.

Accordingly, there is a need to reduce the power consumption of mobile devices without sacrificing the ability to determine location and/or to scan for nearby devices.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

Figure 1:
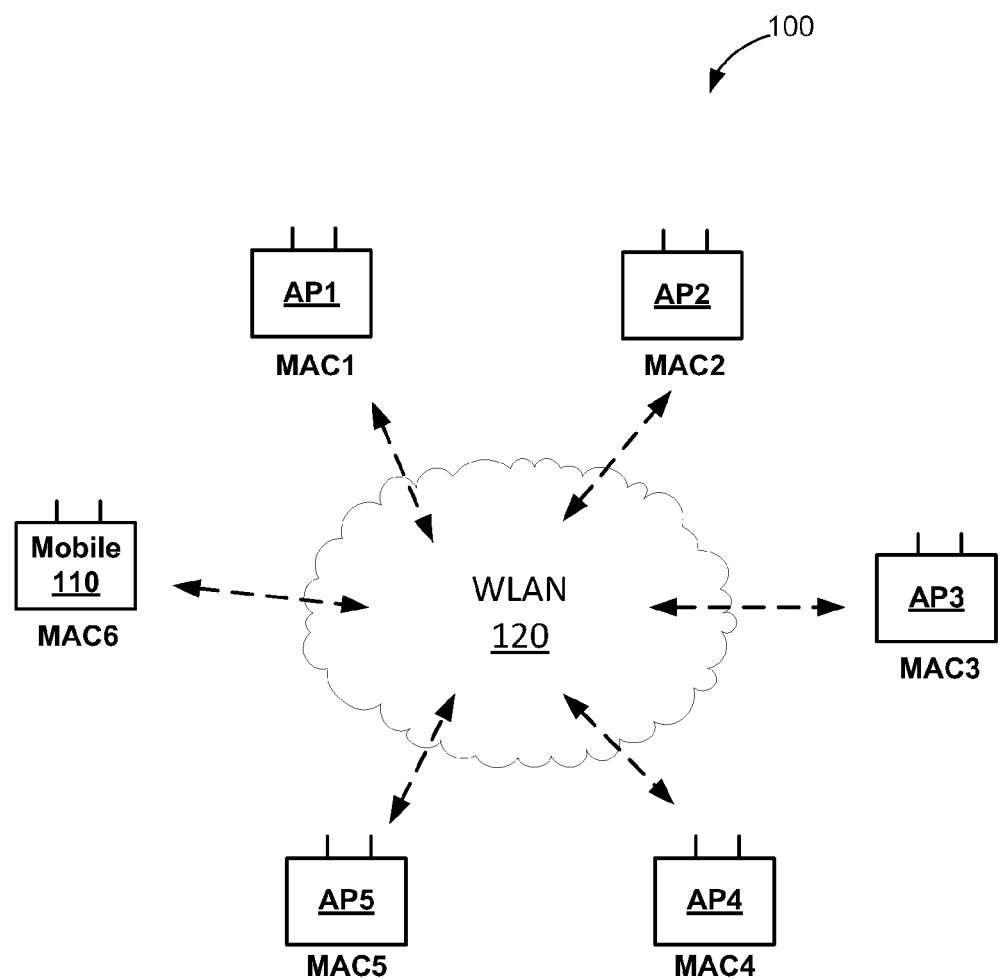
FIG. 1 is a block diagram of a wireless network within which the present embodiments can be implemented.

A method and apparatus for selectively enabling one or more transceiver modules in a mobile communication device to reduce power consumption are disclosed. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

In accordance with the present embodiments, a mobile communication device includes a number of transceiver modules and a power control unit. The transceiver modules allow for wireless communication with other devices using various protocols including, for example, Wi-Fi, Bluetooth, and cellular standards. The power control unit is configured to selectively enable and disable one or more of the transceiver modules to reduce power consumption in the mobile device. More specifically, for some embodiments, the power control unit can disable some or all the transceiver modules to prevent them from performing relatively high-power functions (e.g., active processes such as RTT ranging, GNSS position acquisition, WLAN access point scanning, and Bluetooth device scanning) during periods of time when the mobile device is relatively stationary and thus presumably has little (if any) need to update its position determination or to scan for new nearby devices. While the mobile device is relatively stationary, the power control unit allows a passive (and thus relatively low-power) RSSI ranging operation to monitor the RSSI values of beacon signals broadcast from nearby WLAN access points for variations that can indicate a change in the mobile device's position relative to the access points. If a change in the device's position is detected (e.g., indicating that a user of the mobile device is no longer stationary but rather is moving), then the power control unit can enable one or more of the transceiver modules to perform active processes for position determination (e.g., RTT ranging and GNSS position acquisition) and/or active processes for detecting new nearby devices (e.g., WLAN access point scanning, Bluetooth device scanning, and cellular base station scanning). In this manner, active processes for location determination and scanning operations that consume a relatively large amount of power are enabled only when the mobile device is in motion and can most benefit from more accurate location determination techniques and/or from dynamically detecting nearby access points, cellular base stations, and other nearby devices. These active processes are then disabled to conserve power when the mobile device is relatively stationary and only minimally benefits from such active processes for position determination and/or for detecting nearby devices.

FIG. 1 is a block diagram of a network system 100 within which the present embodiments can be implemented. Network system 100 includes a mobile device 110 and a number of well-known wireless access points AP1-AP5 that form a wireless local area network (WLAN) 120. For purposes of discussion herein, wireless access points AP1-AP5 operate according to the IEEE 802.11 family of standards, and can be any suitable wireless network devices including, for example, base stations, routers, gateways, hubs, or the like. For other embodiments, access points AP1-AP5 can operate according to other suitable wireless standards such as the well-known Bluetooth communication protocols. Mobile device 110 can be any suitable mobile device including, for example, smartphones, tablet computers, laptops, personal digital assistants (PDAs), or the like.

As depicted in FIG. 1, access points AP1-AP5 and mobile device 110 are each assigned a unique MAC address (i.e., MAC1, MAC2, MAC3, MAC4, MAC5, and MAC6, respectively) that is programmed therein by, for example, the manufacturer. Each MAC address, which may be commonly referred to as the "burned-in address," the organizationally unique identifier (OUI), or the BSSID, in one embodiment includes six bytes of data. The first 3 bytes of the MAC address may identify which organization manufactured the access point device (e.g., whether the AP is made by Cisco Systems, Inc.), and may be assigned to such organizations by the Institute of Electrical and Electronic Engineers (IEEE). The second 3 bytes of the MAC address, which may be referred to as the network interface controller (NIC) specific bytes, may be used to uniquely identify the individual access point device.

As mentioned above, acquiring position information using RTT ranging operations is an active process that can consume a relatively large amount of power because of (1) two-way communications between the mobile device and one or more WLAN access points used to generate ranging data and (2) processor-intensive calculations associated with trilateration techniques. Similarly, acquiring position information using GNSS or GPS techniques is an active process that can consume a relatively large amount of power because of (1) continuously monitoring satellite navigation signals and (2) processor-intensive calculations associated with triangulation techniques. In addition, other transceiver modules that use active processes to scan for nearby access points, cellular base stations, and/or nearby Bluetooth devices also consume a relatively large amount of power.

In contrast, estimating distances using RSSI techniques is a passive process that consumes a relatively small amount of power (e.g., compared to the above-described active processes) because it does not involve the mobile device transmitting data signals to one or more nearby WLAN access points. Thus, to conserve power in mobile device 110, it is desirable to use a passive process such as RSSI monitoring rather than an active process such as RTT ranging for position determination whenever possible.

Accordingly, when mobile device 110 is not moving (e.g., when relatively stationary), active processes for position determination and for nearby device scanning are disabled to reduce power consumption, and passive RSSI monitoring operations are enabled to indicate when mobile device 110 begins to move to another location. Thus, for some embodiments, RSSI monitoring operations are primarily used to alert mobile device 110 of a change in its location (e.g., rather than in an attempt to determine its position), which can also reduce power consumption in mobile device 110 by not performing calculations associated with trilateration techniques. In this manner, a passive process such as RSSI monitoring is used to detect movement of the mobile device before enabling an active process such as RTT ranging operations, GNSS position acquisition, and nearby device scanning. Similarly, when the mobile device 110 stops moving, the active processes can be disabled again to conserve power.

More specifically, for some embodiments, mobile device 110 can be configured to monitor the RSSI values associated with beacon signals broadcast by one or more access points AP1-AP5 to detect a variation in RSSI values indicative of a change in location of mobile device 110. The variation in RSSI values can be determined by calculating the difference between a first RSSI value associated with a selected access point at a first time and a second RSSI value associated with the selected access point at a second time. The variation in RSSI values can then be compared with a predetermined threshold value to determine whether the variation in RSSI values is large enough to indicate a change in location of mobile device 110. Subsequently, if a change in location is detected (e.g., if the difference in RSSI values is greater than the predetermined threshold value), then the device 110 can enable one or more transceiver modules to begin performing various active processes for position determination and/or nearby device scanning. Conversely, if a change in location is not detected (e.g., if the difference in RSSI values is not greater than the predetermined threshold value), then the device 110 can continue disabling the one or more transceiver modules to prevent them from performing active processes for position determination and/or nearby device scanning, thereby minimizing power consumption while the mobile device 110 is not moving. Further, disabling active processes that consume relatively large amounts of power while the mobile device 110 is stationary is acceptable because accurate location determination and scanning for new nearby devices is largely unnecessary unless the mobile device 110 is moving and changing locations.

Figure 2:
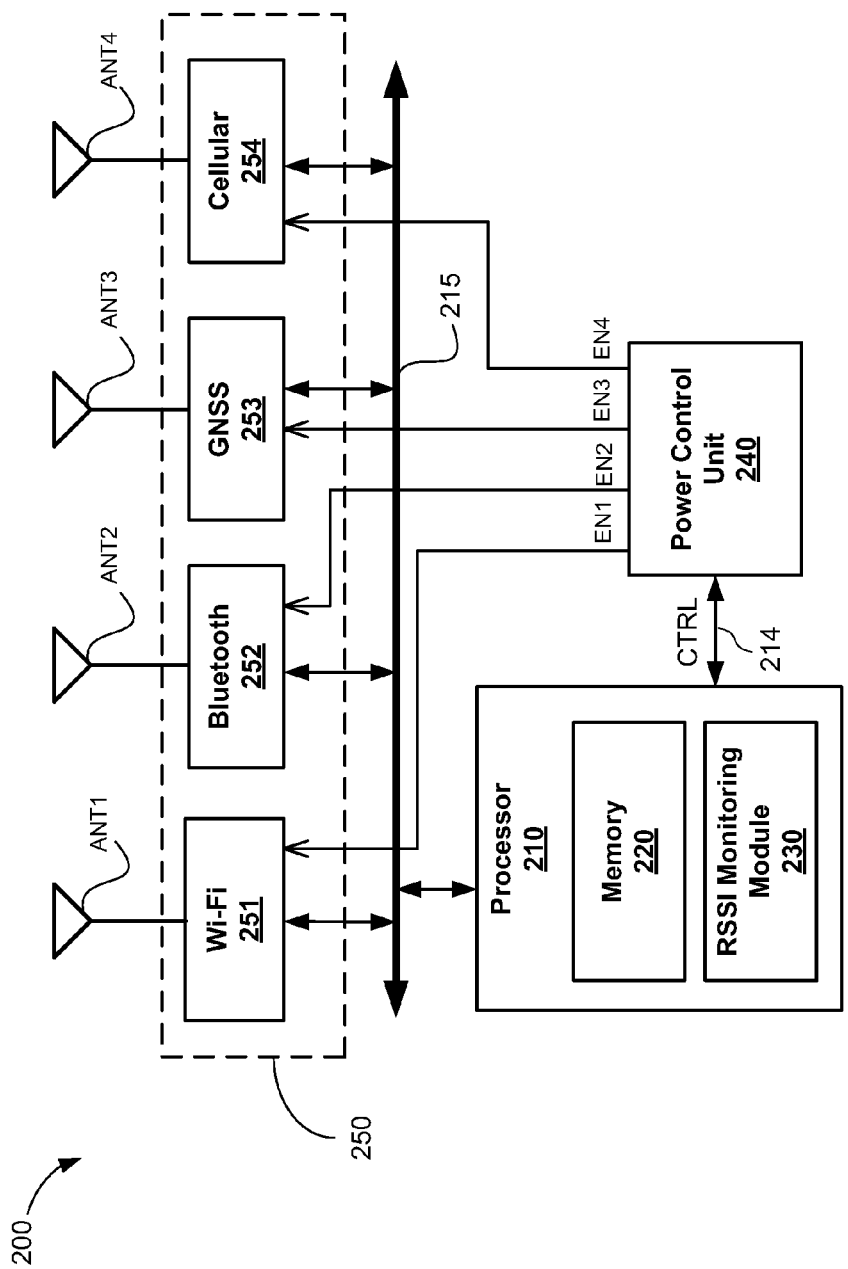
FIG. 2 is a functional block diagram of the mobile communication device of FIG. 1 in accordance with some embodiments.

FIG. 2 is a simplified functional block diagram of a mobile device 200 that is one embodiment of the mobile device 110 of FIG. 1. Mobile device 200 includes a processor 210 having a memory 220 and an RSSI monitoring module 230, a power control unit 240, a transceiver unit 250, and antennas ANT1-ANT4. For other embodiments, memory 220 and/or RSSI monitoring module 230 can be formed separately from processor 210. Memory 220 can be any suitable memory element or device including, for example, RAM, ROM, EEPROM or Flash memory. Although not shown in FIG. 2 for simplicity, mobile device 200 can also include a well-known cache memory that stores frequently used instructions and/or data. Processor 210 can be any suitable processor capable of executing scripts or instructions of one or more software programs stored, for example, in memory 220. Processor 210 is coupled to power control unit 240 by a signal connection 214, and is coupled to transceiver unit 250 by a common data bus 215. For other embodiments, common data bus 215 can be omitted, and processor 210 can transmit and receive data from elements of transceiver unit 250 via dedicated signal connections (not shown for simplicity). For another embodiment, processor 210 can be coupled to power control unit 240 by common data bus 215.

Transceiver unit 250 can include integrated transceiver circuits or can include separate transmitter and receiver circuits. Further, transceiver unit 250 can include any number of individual circuits or modules that perform signal transmission and/or reception functions according to various wireless signaling protocols. For example, for the exemplary embodiment of FIG. 2, transceiver unit 250 is shown to include a plurality of transceiver modules 251-254 that allow mobile device 200 to wirelessly communicate with other devices using various wireless signaling protocols. More specifically, for the exemplary embodiment of FIG. 2, transceiver unit 250 is shown to include a VVi-Fi module 251, a Bluetooth module 252, a GNSS module 253, and a cellular module 254. Wi-Fi module 251 is a well-known circuit configured to control the transmission and reception of Wi-Fi signals for mobile device 200 via associated antenna ANT1 according to Wi-Fi standards (e.g., the IEEE 802.11 family of standards). Bluetooth module 252 is a well-known circuit configured to control the transmission and reception of Bluetooth signals for mobile device 200 via associated antenna ANT2 according to Bluetooth standards (e.g., the Bluetooth version 1.2 or Bluetooth version 2.0 standards). GNSS module 253 is a well-known circuit configured to receive GNSS and/or GPS signals from orbiting navigation satellites via associated antenna ANT3. Cellular module 254 is a well-known circuit configured to control the transmission and reception of cellular signals for mobile device 200 via associated antenna ANT4 according to a suitable cellular protocol (e.g., GSM, CDMA, LTE, and so on). Note for the exemplary embodiment of FIG. 2, each of transceiver modules 251-254 is shown coupled to a separate one of antennas ANT1-ANT4, respectively. However, for actual embodiments, multiple transceiver modules 251-254 can share one or more antennas in a well-known manner to reduce the number of external antennas.

For other embodiments, one or more of transceiver modules 251-254 can be implemented as separate transmitter and receiver circuits. Thus, for one of such other embodiments, Wi-Fi module 251 can be formed as separate Wi-Fi transmitter and receiver circuits, which in turn can be separately enabled and disabled by power control unit 240. More specifically, having separate Wi-Fi transmitter and receiver circuits, or otherwise having the ability to separately enable/disable Wi-Fi transmitter circuitry and Wi-Fi receiver circuitry, may be advantageous because, for example, performing active Wi-Fi processes such as RTT ranging and scanning for new access points can be precluded by disabling the Wi-Fi transmitter circuitry while at the same time enabling the Wi-Fi receiver circuitry to passively poll the RSSI values of beacon signals broadcast by the access points.

Power control unit 240 is configured to selectively enable and disable each of transceiver modules 251-254 using respective enable signals EN1-EN4 that are generated in response to control signals (CTRL) provided by processor 210. More specifically, power control unit 240 can selectively enable and disable Wi-Fi module 251 using Wi-Fi enable signal EN1, can selectively enable and disable Bluetooth module 252 using BT enable signal EN2, can selectively enable and disable GNSS module 253 using GNSS enable signal EN3, and can selectively enable and disable cellular module 254 using cellular enable signal EN4. In accordance with the present embodiments, if a respective one of transceiver modules 251-254 is needed (e.g., to perform one of the aforementioned active processes), then power control unit 240 can enable the respective module by asserting (e.g., to logic high) its corresponding enable signal. Conversely, if a respective one of transceiver modules 251-254 is not needed, power control unit 240 can disable the respective module by de-asserting (e.g., to logic low) its corresponding enable signal, and thereby minimize power consumption.

RSSI monitoring module 230 can be implemented using software, hardware, or a suitable combination thereof. In accordance with the present embodiments, RSSI monitoring module 230 monitors beacon signals broadcast from one or more of access points AP1-AP5 and measures the RSSI values of these beacon signals. The measured RSSI values and associated time stamps are provided to processor 210, which in response thereto compares differences in RSSI values for a given access point with a predetermined threshold value to determine whether mobile device 200 is stationary or is in motion. More specifically, if the difference in RSSI values for a given access point is greater than the predetermined threshold value, then the mobile device 200 is presumed to have changed locations. Conversely, if the difference in RSSI values for a given access point is not greater than the predetermined threshold value, then the mobile device 200 is presumed to have not changed locations. For purposes of discussion herein, the RSSI values are determined by measuring the signal strength of beacon signals received from one or more of access points AP1-AP5 by Wi-Fi module 251 via its associated antenna ANT1. However, for other embodiments, the signal strength of other signals broadcast from access points AP1-AP5 can be used. Further, for other embodiments, the strength of signals broadcast from stationary devices other than access points AP1-AP5 (e.g., Bluetooth signals broadcast by stationary devices such as printers deployed in an office building) can be used to detect a change in location of mobile device 200.

For some embodiments, processor 210 can use the locations of access points AP1-AP5 as reference points in estimating distances between mobile device 200 and each of the access points AP1-AP5, wherein changes in the estimated distance between mobile device 200 and any given access point indicates that the mobile device has changed locations. Note that because changes in these distances, as estimated by changes in corresponding RSSI values as a function of time, are primarily used by processor 210 to detect motion of mobile device 200 (e.g., rather than to calculate the position of mobile device 200), the position of mobile device 200 relative to access points AP1-AP5 is sufficient, for purposes of the present disclosure, to detect motion. Indeed, because knowledge of the precise location coordinates of mobile device 200 is not necessary to detect motion of mobile device 200, relatively low-power passive processes such as RSSI monitoring techniques can be used to detect motion instead of relatively high-power active processes such as RTT ranging and GNSS position acquisition techniques.

Figure 3:
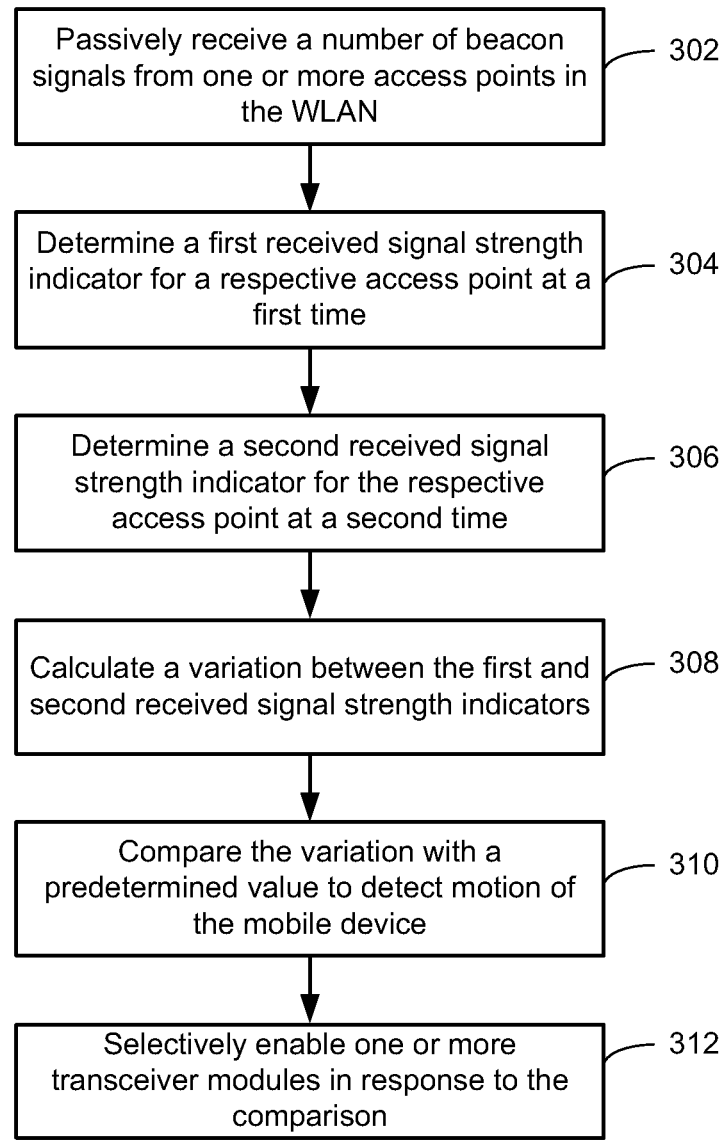
FIG. 3 is an illustrative flow chart depicting an exemplary operation for updating RSSI data and selectively enabling various modules on a mobile device, in accordance with some embodiments

As mentioned above, processor 210 compares differences in RSSI values taken at different times with the predetermined threshold value to determine whether mobile device 200 is in motion. For some embodiments, the RSSI values correspond to temporally spaced beacon signals broadcast by a selected one of access points AP1-AP5. For example, one exemplary operation of mobile device 200 is described below with respect to the illustrative flow chart 300 of FIG. 3. For this example, assume that mobile device 200 is initially stationary (e.g., not moving), and that transceiver modules 251-254 are largely disabled to prevent mobile device 200 from performing any of the aforementioned active processes while device 200 is stationary. More specifically, while transceiver modules 252-254 may be completely disabled, the reception capabilities of Wi-Fi module 251 may remain operational to receive Wi-Fi beacon signals broadcast from the selected access point. Thus, for some embodiments, the transmission capabilities of Wi-Fi module 251 can be disabled, and processor 210 can instruct Wi-Fi module 251 to not perform any RTT ranging operations and to not broadcast any probe or other scanning signals while the mobile device 200 is not moving.

In operation, mobile device 200 passively receives beacon signals broadcast from one or more of access points AP1-AP5 via Wi-Fi antenna ANT1 (302). RSSI monitoring module 230 determines a first RSSI value for a respective access point at a first time t1 (304). Then, after a period of time, RSSI monitoring module 230 determines a second RSSI value for the respective access point at a second time t2 (306). Then, processor 210 receives the first and second RSSI values from RSSI monitoring module 230, and calculates a variation between the first and second RSSI values (308). For some embodiments, processor 210 calculates the variation as the instantaneous difference between the first and second RSSI values. For other embodiments, processor 210 calculates the variation as an average difference between the first and second RSSI values. As used herein, the term "average" can include an arithmetic mean, a geometric mean, a harmonic mean, or any other suitable types of mathematical approaches to obtain a central tendency or mean. Then, processor 210 compares the variation in RSSI values with the predetermined threshold value to determine whether mobile device 200 has changed locations during the elapsed time period (e.g., between times t1 and t2) (310). In response thereto, processor 210 selectively enables one or more of the transceiver modules 251-254 (312).

More specifically, if the variation does not exceed the predetermined threshold value, which indicates that mobile device 200 has not moved (or is substantially stationary) during the elapsed time period, then processor 210 continues to disable the transceiver modules 251-254 or otherwise prevent them from performing any of the aforementioned active processes, thereby minimizing power consumption while mobile device 200 is not moving. Functionality of mobile device 200 is not adversely affected by active processes such as position determination (e.g., using RTT techniques or GNSS position) and scanning for nearby devices (e.g., new access points, nearby BT-enabled devices, or nearby cellular towers) while mobile device 200 is stationary because unless mobile device 200 is moving, the need to detect new access points, to accurately track changes in position, or to scan for new devices or cellular towers is negligible.

Conversely, if the variation exceeds the predetermined threshold value, which indicates that mobile device 200 has moved from its original location during the elapsed time period, then processor 210 can enable the transceiver modules 251-254 or otherwise allow them to perform one or more of the aforementioned active processes. Thus, for example, when mobile device 200 changes locations, processor 210 can enable Wi-Fi module 251 to resume sending probe signals to detect nearby access points, can enable Bluetooth module 252 to resume scanning for BT-enabled devices, can enable GNSS module 253 to resume receiving and processing satellite signals for position acquisition and navigation functions, and can enable cellular module 254 to resume scanning for nearby cellular towers (e.g., for roaming purposes).

Figures 4A, 4B:
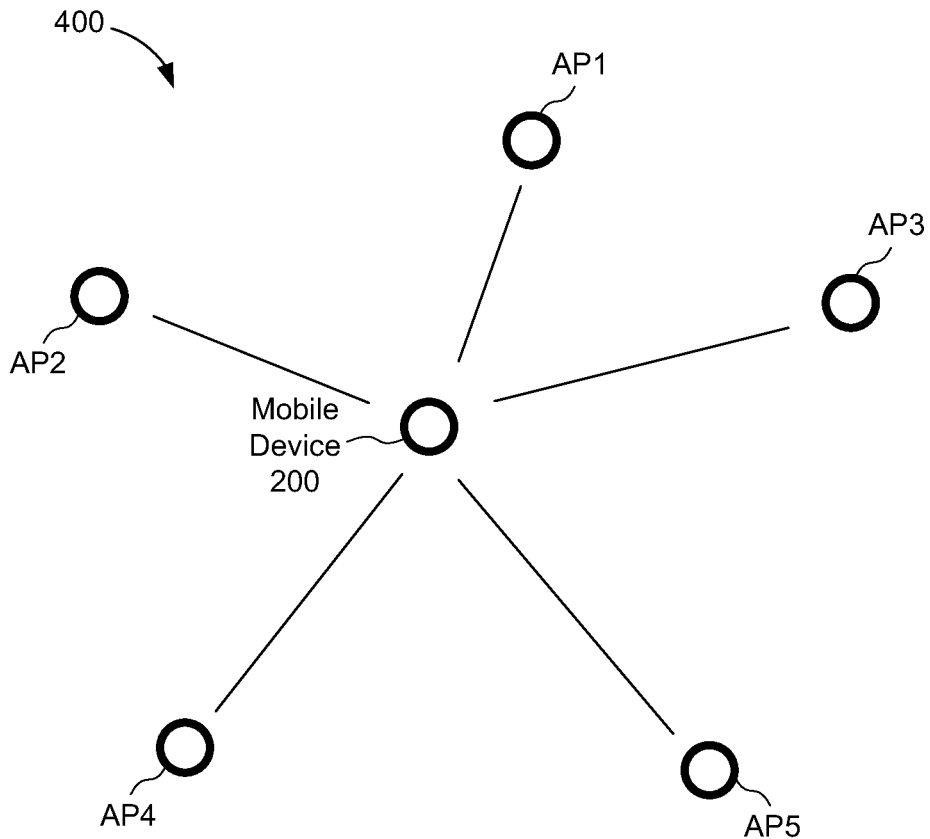
FIG. 4A is a block diagram of the wireless network of FIG. 1 depicting the mobile communication device acquiring an initial set of received signal strength indicators (RSSI) values from visible access points, in accordance with some embodiments.
FIG. 4B is a table illustrating storage of the initial RSSI values in the mobile communication device, in accordance with some embodiments.

For other embodiments, the mobile device 200 can monitor RSSI values of beacon signals broadcast by all visible access points in WLAN 120. For example, FIG. 4A is a block diagram 400 depicting mobile device 200 acquiring a first set of received signal strength indicator (RSSI) values from access points AP1-AP5. As depicted in FIG. 4A, mobile device 200 is initially within the wireless range of all access points AP1-AP5, and therefore all five access points AP1-AP5 are initially visible to mobile device 200. Referring also to FIG. 2, the RSSI monitoring module 230 within mobile device 200 measures a first RSSI value for each of the five access points AP1-AP5 at a first time t1. Then, the first RSSI values for access points AP1-AP5 are provided to processor 210 and stored in a table 450 within memory 220, as depicted in FIG. 4B. More specifically, table 450 includes five row entries 451-455, each for storing a first RSSI value (RSSI_Old), a second RSSI value (RSSI_New), and a variation value ($\Delta$) for a corresponding one of access points AP1-AP5. Note that the BSSID column stores the MAC addresses MAC1-MAC5 of respective access points AP1-AP5.

For some embodiments, mobile device 200 employs an RSSI scale of 0 to 127, where 0 denotes the strongest level of signal strength (e.g., from a nearby access point), and 127 denotes the weakest level of signal strength (e.g., from a distant access point). However, a person having ordinary skill in the art will understand that the techniques disclosed herein are applicable to other suitable RSSI scales as well.

Figures 4C, 4D:
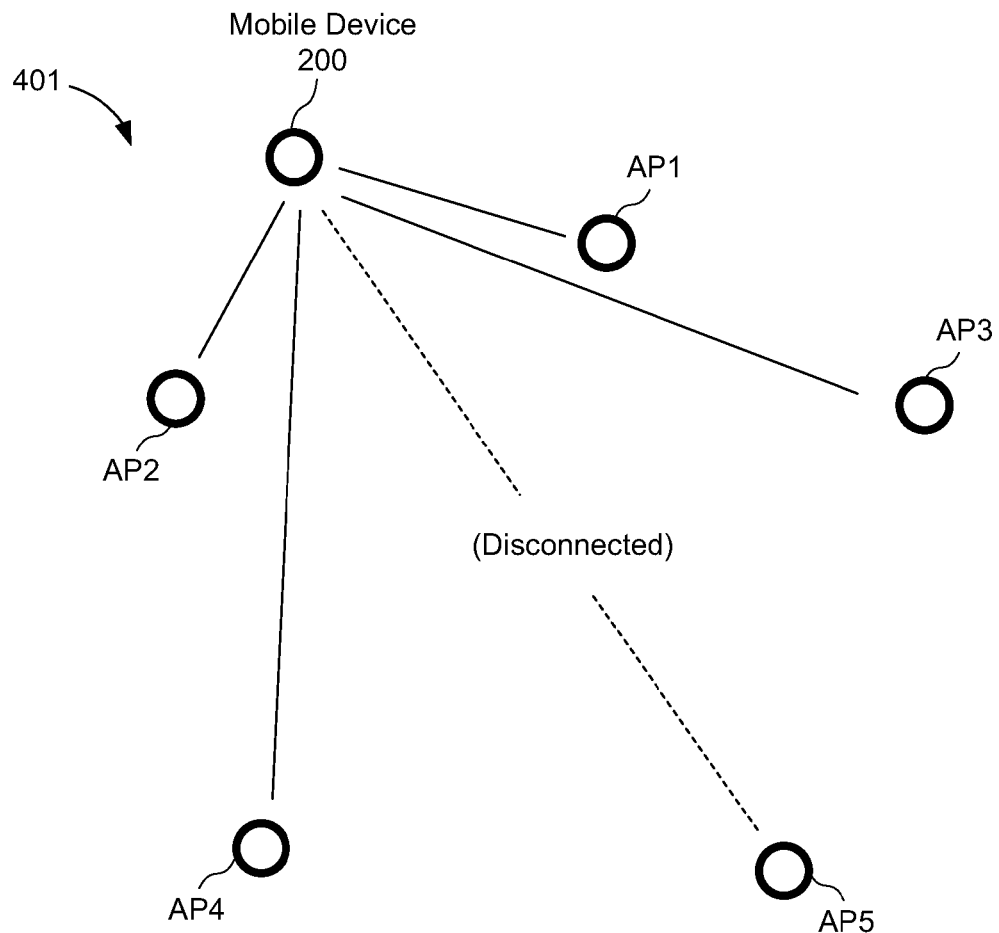
FIG. 4C is a block diagram of the wireless network of FIG. 1 depicting the mobile communication device acquiring a new set of RSSI values from visible access points, in accordance with some embodiments.
FIG. 4D is a table illustrating the storage of the new RSSI values in the mobile communication device, in accordance with some embodiments.

FIG. 4C is a block diagram 401 depicting mobile device 200 acquiring a second set of RSSI values from access points AP1-AP5. Note that mobile device 200 has moved from its original position in FIG. 4A to a new location as depicted in FIG. 4C. Also referring to FIG. 2, RSSI monitoring module 230 within mobile device 200 measures a second RSSI value for each of the five access points AP1-AP5 at a second time t2, and processor 210 stores these second RSSI values into table 450 of memory 220, as depicted in FIG. 4D. More specifically, table 450 now stores new RSSI values for access points AP1-AP4: a new RSSI value for access point AP5 is not provided because after moving to the new position, mobile device 200 is now too far away from access point AP5 to maintain a connection therewith, and therefore has lost its connection with access point AP5.

Thereafter, processor 210 calculates a variation by comparing the first RSSI values in the RSSI_Old column with the second RSSI values in the RSSI_New column. As illustrated in table 450, the variation is calculated as the instantaneous difference between the RSSI_Old values and the RSSI_New values. In other embodiments, the variation can be calculated as an average difference between the first and second RSSI values. The resulting variations are stored by processor 210 into table 450 under the Δ column, each in an associated one of rows 451-455.

Further, in accordance with the present embodiments, the predetermined threshold value can be an arbitrary number selected to reflect the environment surrounding mobile device 200. It is noted that present embodiments can use various predetermined values to detect motion for enabling different active processes. For example, mobile device 200 can use a first predetermined value to detect motion when determining whether to enable Wi-Fi module 251 to begin performing RTT ranging operations, can use a second predetermined value to detect motion when determining whether to enable Bluetooth module 252 to begin scanning for new Bluetooth-enabled devices, can use a third predetermined value to detect motion when determining whether to enable GNSS module 253 to begin receiving and processing satellite signals for position acquisition, and can use a fourth predetermined value to detect motion when determining whether to enable cellular module 254 to begin scanning for new cellular base stations.

Furthermore, in accordance with some embodiments, mobile device 200 can be configured to enable or disable one or more transceiver modules 251-254 based upon the number of access points for which the RSSI variations exceed the predetermined value. The total number of access points for which the RSSI variations exceed the predetermined value is called the trigger number. Thus, for the example described above with respect to FIGS. 4A-4D, if the predetermined value is set to 10 and the trigger number is set to 3, then the entries matching these two criteria are entries 453, 454, and 455, as shown in FIG. 4D (where the corresponding Δ values are highlighted in boldface). In this case, because the variation in RSSI values of 3 access points exceed the predetermined value of 10, mobile device 200 ascertains that it is in motion and enabled one or more of transceiver modules 251-254 to begin performing one or more of the aforementioned active processes.

In accordance with some embodiments, the predetermined threshold value and the trigger number together form a trigger sensitivity metric. The trigger sensitivity can be dynamically programmed, either manually or automatically, based on the environment surrounding the mobile device 200 and/or in responses to changes in the environment surrounding the mobile device 200. More specifically, the predetermined threshold value and/or the trigger number can be dynamically adjusted to reflect changes in the environment surrounding mobile device 200.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of reducing power consumption in a mobile communication device that includes a transceiver module and that is proximate to a wireless local area network (WLAN) having a multitude of wireless access points, the method comprising:
    passively receiving first and second WLAN beacon signals from each of a plurality of selected access points;
    determining, from the first beacon signals, a first received signal strength indicator (RSSI) value for each of the selected access points;
    determining, from the second beacon signals, a second RSSI value for each of the selected access points;
    calculating, for each of the selected access points, a variation between the first and second RSSI values for the selected access point;
    comparing each variation in RSSI values with a predetermined value to detect motion of the device;
    ascertaining whether the number of variations in RSSI values that exceeds the predetermined number is greater than a trigger number, wherein the trigger number indicates a minimum number of the selected access points from which motion of the device is detected; and
    selectively enabling the transceiver module in response to the ascertaining.

2. The method of claim 1, wherein the transceiver module broadcasts probe signals when enabled and does not broadcast any signals when disabled.

3. The method of claim 1, wherein the selectively enabling comprises:
    enabling the transceiver module if the number of variations that exceed the predetermined value is greater than or equal to the trigger number; and
    disabling the transceiver module if the number of variations that exceed the predetermined value is less than the trigger number.

4. The method of claim 1, further comprising:
    dynamically adjusting the predetermined value in response to changes in an environment surrounding the device.

5. A mobile communication device for communicating with a wireless local area network (WLAN) having a multitude of wireless access points, the device comprising:
    a transceiver to passively receive first and second WLAN beacon signals from each of a plurality of selected access points; and
    a processor, coupled to the transceiver, to:
        determine, from the first beacon signals, a first received signal strength indicator (RSSI) value for each of the selected access points;
        determine, from the second beacon signals, a second RSSI value for each of the selected access points;
        calculate, for each of the selected access points, a variation between the first and second RSSI values for the selected access point;
        compare each variation in RSSI values with a predetermined value to detect motion of the device;

ascertain whether the number of variations in RSSI values that exceeds the predetermined number is greater than a trigger number, wherein the trigger number indicates a minimum number of the selected access points from which motion of the device is detected; and selectively enable the transceiver in response to the ascertaining.

6. The device of claim 5, wherein the transceiver is to broadcast probe signals when enabled and does not broadcast any signals when disabled.

7. The device of claim 5, wherein the processor, when selectively enabling the transceiver, is to:

enable the transceiver if the number of variations that exceed the predetermined value is greater than or equal to the trigger number; and disable the transceiver if the number of variations that exceed the predetermined value is less than the trigger number.

8. The device of claim 5, wherein the processor is to further:

dynamically adjust the predetermined value in response to changes in an environment surrounding the device.

9. A mobile communication device that includes a transceiver module and that is proximate to a wireless local area network (WLAN) having a multitude of wireless access points, the device comprising:

means for passively receiving first and second WLAN beacon signals from each of a plurality of selected access points;

means for determining, from the first beacon signals, a first received signal strength indicator (RSSI) value for each of the selected access points;

means for determining, from the second beacon signals, a second RSSI value for each of the selected access points;

means for calculating, for each of the selected access points, a variation between the first and second RSSI values for the selected access point;

means for comparing each variation in RSSI values with a predetermined value to detect motion of the device;

means for ascertaining whether the number of variations in RSSI values that exceeds the predetermined number is greater than a trigger number, wherein the trigger number indicates a minimum number of the selected access points from which motion of the device is detected; and means for selectively enabling the transceiver module in response to the ascertaining.

10. The device of claim 9, wherein the transceiver module broadcasts probe signals when enabled and does not broadcast any signals when disabled.

11. The device of claim 9, wherein the means for selectively enabling comprises:

means for enabling the transceiver module if the number of variations that exceed the predetermined value is greater than or equal to the trigger number; and means for disabling the transceiver module if the number of variations that exceed the predetermined value is less than the trigger number.

12. The device of claim 9, further comprising:

means for dynamically adjusting the predetermined value in response to changes in an environment surrounding the device.

* * * * *